(12) United States Patent
Suzuki (10) Patent No.: US 8,099,613 B2
(45) Date of Patent: Jan. 17, 2012

(54) METHOD AND APPARATUS FOR REDUCED POWER CONSUMPTION IN AN IMAGE FORMING DEVICE

(75) Inventor: Takaaki Suzuki, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 938 days.

(21) Appl. No.: 11/936,204

(22) Filed: Nov. 7, 2007

(65) Prior Publication Data

US 2008/0114996 A1    May 15, 2008

Related U.S. Application Data

(60) Provisional application No. 60/865,088, filed on Nov. 9, 2006.

(30) Foreign Application Priority Data

Jul. 4, 2007   (JP) .................................. 2007-176577

(51) Int. Cl.
*G06F 1/32* (2006.01)
(52) U.S. Cl. ....................................... 713/320; 713/324
(58) Field of Classification Search .................. 713/324, 713/320; 358/1.14
See application file for complete search history.

(56) References Cited

U.S. PATENT DOCUMENTS

| | | | | |
|---|---|---|---|---|
| 5,708,821 A * | 1/1998 | Takikita | .................... | 713/310 |
| 5,933,581 A * | 8/1999 | Miyazaki et al. | ............. | 358/1.14 |
| 2002/0140963 A1* | 10/2002 | Otsuka | .......................... | 358/1.14 |
| 2003/0147094 A1* | 8/2003 | Yamashita et al. | ............ | 358/1.14 |
| 2005/0094180 A1* | 5/2005 | Nishimoto et al. | ........... | 358/1.13 |
| 2005/0108584 A1* | 5/2005 | Kawakami et al. | ............ | 713/300 |
| 2008/0240741 A1* | 10/2008 | Sasama et al. | .................... | 399/9 |

FOREIGN PATENT DOCUMENTS

| JP | 2001-232906 | * | 8/2001 |
|---|---|---|---|
| JP | 2005-037612 | * | 7/2003 |
| JP | 2003-233276 | | 8/2003 |

* cited by examiner

*Primary Examiner* — Chun Cao
(74) *Attorney, Agent, or Firm* — Turocy & Watson, LLP (57) ABSTRACT

An image forming apparatus of the invention can operate in a first mode for performing an image forming process and a second mode having low power consumption at a time of stop of the image forming process, and includes a detection unit to detect the presence and absence of an error of the image forming apparatus, an operation panel having a display unit capable of displaying a detection result of the detection unit, a main control unit to control a mode to switch to the second mode when the error is detected in the first mode and to control a mode to return to the first mode when the error is removed in the second mode, a power source unit to supply power necessary for an operation of each of the modes, and a display control unit to turn the display unit on at any time in the first mode, to turn the display unit off in the second mode, and to turn the display unit on when an operation unit is operated in the second mode.

17 Claims, 4 Drawing Sheets

METHOD AND APPARATUS FOR REDUCED POWER CONSUMPTION IN AN IMAGE FORMING DEVICE

CROSS-REFERENCE TO RELATED APPLICATION

This application is based upon and claims the benefit of U.S. Provisional Application No. 60/865,088, filed on Nov. 9, 2006, and Japanese Patent Application No. 2007-176577, filed on Jul. 4, 2007, the entire contents of which are incorporated herein by reference.

BACKGROUND OF THE INVENTION

1. Field of the Invention

The present invention relates to an image forming apparatus such as an MFP (Multi-Function Peripherals) which is a digital compound machine, a copier or a printer, and particularly to an image forming apparatus having a normal mode and a power saving mode, and a control method thereof.

2. Description of the Related Art

In general, in an image forming apparatus such as an MFP, a copier or a printer, reduction in power consumption is attempted from the viewpoint of environmental protection. For example, in an image forming apparatus including a fixing unit, a heat roller and a pressure roller are provided in the fixing unit, and a sheet is passed through between the heat roller and the pressure roller so that an image is fixed on the sheet.

In the image forming apparatus as stated above, in a normal mode, the rated power is supplied to the heat roller to heat the heat roller up to the fixing temperature and the image forming process is performed. Besides, in a standby mode in which the image forming process is not performed for a specified time, power lower than the rated power is supplied to the heat roller, and the heat roller is kept at a temperature lower than that in the normal mode and is placed in a preheat state. Alternatively, there is a case where heating of the heat roller is stopped and a sleep state is generated.

When the standby mode is switched to the normal mode, the heat roller is returned from the preheat state or the sleep state to the fixing temperature, and performs the image forming process. Accordingly, in a period in which the image process is not performed for a specified time, the power consumption can be reduced.

JP-A-2003-233276 discloses an image forming apparatus which can switch between a normal mode and a power saving mode. In this example, there are provided sheet detection means for detecting the presence and absence of a sheet in a paper feed unit, and periphery detection means for detecting a peripheral state of the image forming apparatus, and in a case where the sheet can not be detected, or there is no operator around the image forming apparatus, switching is made to the power saving mode.

However, in the image forming apparatus of the related art, although the shift is made to the power saving mode in the case where the image formation is not performed for the specified time, with respect to the time of occurrence of various errors, a countermeasure for power saving is not taken at all. Besides, also in the example of the above publication, there is no disclosure on a countermeasure for power saving at the time of occurrence of various errors.

That is, in the case where running out of toner or sheet jam occurs, or a serviceman call etc. occurs, in spite of the state where the image forming process can not be performed, the rated power is supplied to the heat roller of the image forming apparatus and the display unit of the operation panel, and wasteful power is consumed.

The invention provides an image forming apparatus which can effectively reduce power consumption even in the case where various errors occur.

DETAILED DESCRIPTION OF THE INVENTION

Throughout this description, the embodiments and examples shown should be considered as exemplars, rather than limitations on the apparatus of the present invention.

Hereinafter, an embodiment of the invention will be described in detail with reference to the drawings. Incidentally, same portions in the respective figures are denoted by same reference numerals.

Figure 1:
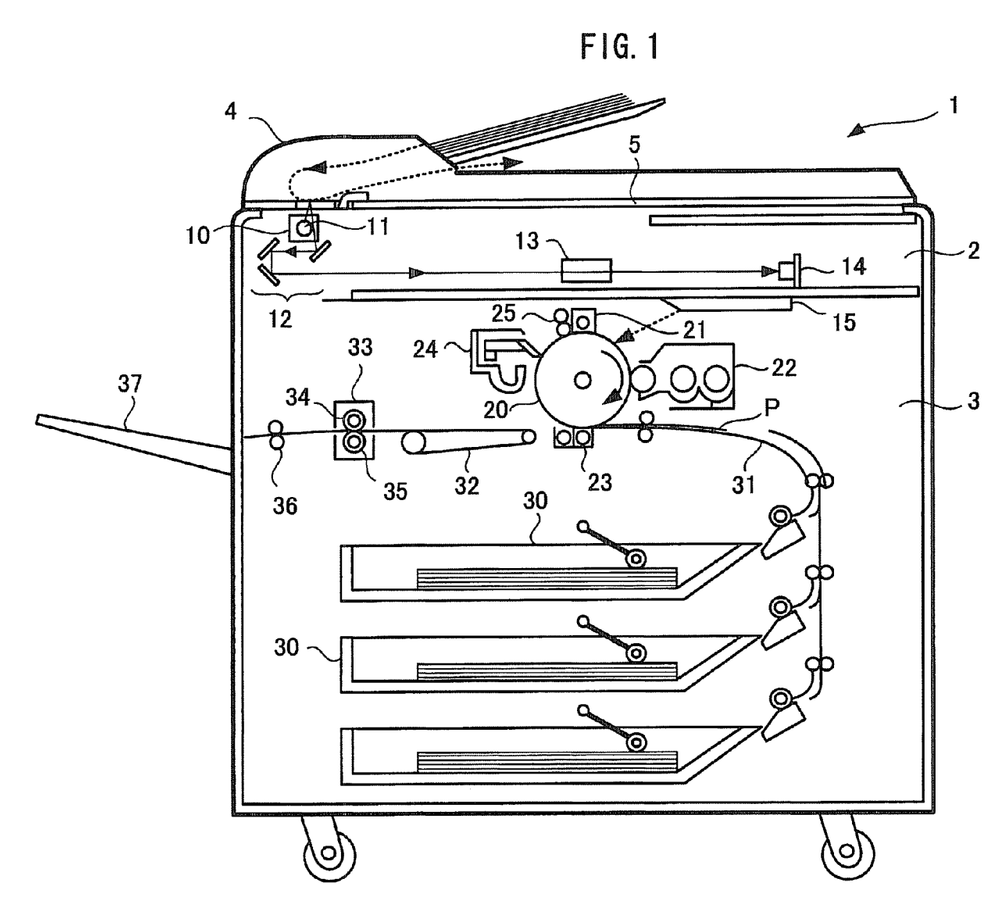
FIG. 1 is a schematic structural view showing an image forming apparatus of an embodiment of the invention.

FIG. 1 is a schematic structural view showing an embodiment of an image forming apparatus of the invention. Incidentally, in the following description, although an MFP (Multi-Function Peripherals) as a compound machine is used as an example, the invention can be applied also to another image forming apparatus such as a printer or a copier.

An image forming apparatus 1 includes a scanner unit 2 and a printer unit 3, and further includes an auto document feeder (ADF) 4 and a transparent document table 5 in the upper part of the image forming apparatus 1. The scanner unit 2 reads an image of an original document, and the printer unit 3 forms an image on a sheet based on the read data. The scanner unit 2 and the printer unit 3 constitute an image forming unit.

The scanner unit 2 includes a carriage 10, an exposure lamp 11 provided in the carriage 10, a reflecting mirror 12, a lens 13, a CCD 14 (Charge Coupled Device) to capture the reflected light from the reflecting mirror 12, and a laser unit 15.

In the scanner unit 2, in order to read an original document placed on the document table 5 or an original document sent from the auto document feeder 4, light from the exposure lamp 11 provided in the carriage 10 is irradiated to the original document from below the document table 5, and the reflected light from the original document is captured by the CCD 14 through the reflecting mirror 12 and the lens 13.

Image information captured by the CCD 14 is outputted as an analog signal. The analog signal is converted into a digital signal and is further subjected to an image process, and image data is generated. The image data is supplied to the laser unit 15, and a laser beam is generated from the laser unit 15 in accordance with the image data.

The printer unit 3 includes a photoconductor 20, and around the photoconductor 20, there are provided, in its rotation direction, a charging device 21, a developing device 22, a transfer device 23, a cleaner 24, and a charge-removal lamp 25. The laser beam from the laser unit 15 is irradiated onto the photoconductor 20, and an electrostatic latent image corresponding to the image information of the original document is formed and held on the outer peripheral surface of the photoconductor 20.

When image formation starts, the charging device 21 discharges at a specified discharge position, and charges the outer peripheral surface of the rotating photoconductor 20 with a specified electric charge uniformly in the axial direction. Next, the laser beam is irradiated to the photoconductor 20 from the laser unit 15, and the electrostatic latent image is formed on the outer peripheral surface of the photoconductor 20 and is held.

A developer (for example, toner) is provided from the developing device 22 to the outer peripheral surface of the photoconductor 20, and the electrostatic latent image is converted into a toner image and is developed. In this developing device 22, a developing roller is rotatably provided to face the photoconductor 20, and the toner is supplied to the photoconductor 20 by the rotation of the developing roller.

The toner image formed on the outer peripheral surface of the photoconductor 20 is electrostatically transferred to the sheet P by the transfer device 23. The sheet P is transported from an after-mentioned paper feed device 30 via a transport path 31. The toner not transferred but remaining on the photoconductor 20 is removed by the cleaner 24 positioned at the downstream side of the photoconductor 20 in the rotation direction, and then, the remaining charge on the outer peripheral surface of the photoconductor 20 is removed by the charge-removal lamp 25.

Incidentally, the structure of the printer unit 2 is not limited to the illustrated example, and another system, for example, a system using an intermediate transfer belt or the like can also be used.

On the other hand, in order to supply sheets to the printer unit 3, plural paper feed devices 30 are provided in the lower part of the printer unit 3. The sheet from the paper feed device 30 is transported to the transfer device 23 through the transport path 31.

Besides, the sheet P on which the toner image has been transferred by the printer unit 3 is transported to a fixing device 33 via a transport belt 32. In the fixing device 33, a heat roller 34 and a pressure roller 35 are provided to face each other, and the sheet P is passed through between the heat roller 34 and the pressure roller 35, so that the toner image transferred on the sheet P is fixed to the sheet P.

A heater (not shown) is disposed in the heat roller 34 of the fixing device 33, and power is applied to this heater so that the heat roller 34 is heated up to a specified temperature. The sheet P on which the toner image is fixed and the image formation is completed is discharged to a tray 37 by a paper discharge roller 36.

Figure 2:
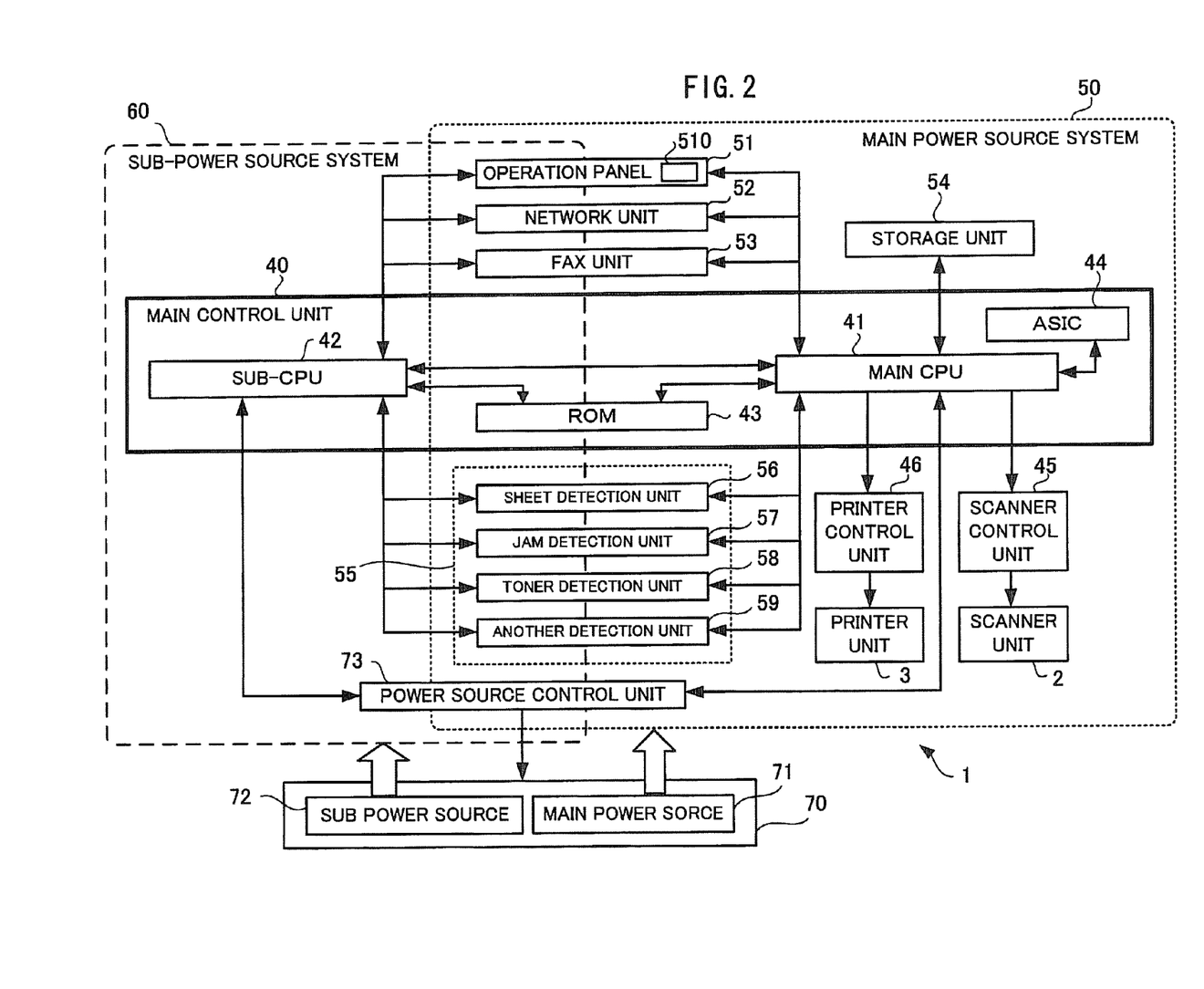
FIG. 2 is a block diagram of a control system of the image forming apparatus of the embodiment of the invention.

FIG. 2 is a block diagram of a control system of the image forming apparatus of the embodiment of the invention. In FIG. 2, the image forming apparatus 1 includes a main control unit 40.

The main control unit 40 is for controlling the whole system of the image forming apparatus 1, and includes a main CPU (first control unit) 41, a sub-CPU (second control unit) 42, a ROM 43 and an ASIC 44.

The sub-CPU 42 is a CPU having lower specs than the main CPU 41 and having lower power consumption, and the ROM 43 is a Read Only Memory for storing programs of various operations of the image forming apparatus 1. Besides, the ASIC 44 is an Application Specified IC to perform an image processing or image manipulation.

The main CPU 41 controls a scanner control unit 45 and a printer control unit 46, and the scanner control unit 45 and the printer control unit 46 control the operation of the image forming unit (the scanner unit 2 and the printer unit 3) based on instructions of the main CPU 41.

Besides, as shown in FIG. 2, the control system of the image forming apparatus 1 includes a main power source system 50 and a sub-power source system 60, the main power source system 50 is controlled by the main CPU 41, and the sub-power source system 60 is controlled by the sub-CPU 42.

First, the main power source system 50 will be described.

The main CPU 41 is connected with an operation panel 51, a network unit 52, a FAX unit 53 and a storage unit 54 in addition to the ROM 43. The operation panel 51 includes an operation unit including various keys such as a numeric keypad, and a display unit 510, and the number of prints, selection of a sheet size, magnification and the like are inputted from this operation panel 51.

The network unit 52 is for performing communication with a host device, for example, a PC (Personal Computer), installed at a place remote from the image forming apparatus 1. The host device is connected to the network unit 52 through a network such as a LAN, and can perform the operation of the image forming apparatus 1. The FAX unit 53 is connected to a telephone line, and transmits and receives signals of image information generated by the image forming apparatus 1 through the telephone line. Besides, the storage unit 54 is for storing image data.

Besides, the main CPU 41 (and the sub-CPU 42) is connected with a detection unit 55 capable of detecting various errors. The detection unit 55 includes, for example, a sheet detection unit 56, a jam detection unit 57, a toner detection unit 58, and another detection unit 59.

The sheet detection unit 56 is mounted in the paper feed device 30 and detects whether there is a sheet in the paper feed device 30. The jam detection unit 57 is mounted at a suitable position of a transport passage such as the transport path 31 or the transport belt 32, and detects a jam (paper jam) on the transport passage. The jam detection unit 57 includes, for example, a light transmission sensor including a light emitting element and a light receiving element or a combination of a swingable lever member and a light transmission sensor, and detects a jam and a sheet stop position at the time of jam occurrence.

The toner detection unit 58 is mounted in, for example, the developing device 22, and detects the presence and absence of a developer (toner) to be discharged from a development container and the state of the developer in the development container (for example, toner density and amount) by an optical sensor, a piezoelectric sensor or the like, and detects the running out of toner.

The another error detection unit 59 detects, for example, a serviceman call. For example, in the case where a HDD is used as the storage unit 54, the number of times of printing is counted and when it reaches a fixed value, or a failure is predicted by check of the access speed of the HDD and when the exchange of the HDD is requested, the serviceman call is generated.

Besides, when a defect occurs in various circuit boards such as a system board, or a defect occurs in various sensors, motors or the like, the serviceman call is issued in order to request repair or exchange. The another detection unit 59 detects the serviceman call as stated above.

Besides, although the detection unit 55 is for detecting various errors in the image forming apparatus 1, in the case where the error is removed, the error removal can also be detected.

Next, the sub-power source system 60 will be described.

The sub-CPU 42 is connected with the ROM 43, the operation panel 51, the network unit 52, the FAX unit 53, and the detection unit 55. Besides, the sub-CPU 42 is connected to the main CPU 41.

Besides, a power source circuit 70 to supply power to the main power source system 50 and the sub-power source system 60 is provided. The power source circuit 70 includes a main power source 71 to supply power source voltage to the main power source system 50 and a sub-power source 72 to supply power source voltage to the sub-power source system 60, and the power source voltage supplied from the sub-power source 72 is set to be lower than the power source voltage supplied from the main power source 71.

The supply of the power source voltage to the main power source system 50 and the supply of the power source voltage to the sub-power source system 60 are performed under the control of a power source control unit 73, and in response to instructions from the main CPU 41 or the sub-CPU 42, the power source control unit 73 supplies the power to the main power source system 50 or the sub-power source system 60.

A first mode in which the voltage from the main power source 71 is supplied to the main power source system 50 is a normal mode, and a second mode in which the voltage from the sub-power source 72 is supplied to the sub-power source system 60 is a power saving mode, and the power source circuit 70 generates the power source voltages suitable for the first mode and the second mode. The power source circuit 70 and the power source control unit 73 constitute a power source unit.

Next, the operation mode of the image forming apparatus will be described.

In the normal mode (first mode), the main power source 71 supplies necessary power source voltages to the respective units of the main power source system 50, for example, the main control unit 40, the scanner unit 2, the printer unit 3, the operation panel 51, the network unit 52, the FAX unit 53, the storage unit 54, and the detection unit 55.

In the main power source system 50, in a print mode in which image formation is performed, the power source voltage is supplied from the main power source 71 to the scanner unit 2 or the printer unit 3, and printing is performed. Also in the standby mode in which image formation is immediately started when a print instruction is issued, the power source voltage is supplied from the main power source 71.

In the standby mode, it is not always necessary to heat the heat roller 34 of the fixing device 33 by the rated voltage, and a slightly lower voltage is supplied and heating is performed. In this embodiment, the normal mode includes the print mode and the standby mode.

In the normal mode, when the operation panel 51 is operated and a capture instruction of image information of an original document is inputted, the main CPU 41 controls the scanner control unit 45. By this, the scanner unit 2 reads the image information of the original document and stores the read image information into the storage unit 54. Alternatively, also in the case where image information is sent from the PC through the network unit 52 or image information is sent from the FAX unit 53, the image information is stored in the storage unit 54.

The image information stored in the storage unit 54 is sent to the printer control unit 46 under the control of the main CPU 41, and an image is formed in the printer unit 3.

On the other hand, in the case where various errors are detected by the detection unit 55, the main CPU 41 switches the operation of the image forming apparatus 1 from the normal mode to the power saving mode (second mode) in accordance with the operation program stored in the ROM 43. Besides, also in the case where an instruction of image formation is not issued in the standby mode for a specified time, the main CPU 41 switches to the power saving mode. Incidentally, the power saving mode means a state in which power is supplied to only the sub-power source system 60.

In the power saving mode, the sub-power source 72 supplies necessary power source voltages to the respective units of the sub-power source system 60, for example, the operation panel 51, the network unit 52, the FAX unit 53, and the detection unit 55. In the power saving mode, since the image forming unit (the scanner unit 2 and the printer unit 3) is stopping the operation, the power source voltage from the sub-power source 72 may be a low voltage.

The power source control unit 73 controls the power source circuit 70 based on the control of the sub-CPU 42, and in the power saving mode, power is supplied from the sub-power source 72 to the sub-power source system 60.

In this power saving mode, power is not supplied to the scanner unit 2, the printer unit 3, the main CPU 41 and the like of the main power source system 50.

In the power saving mode, the detection unit 55 is controlled by the sub-CPU 42, and when an error signal from the detection unit 55 is removed, the sub-CPU 42 immediately controls the power source control unit 73 to start power supply to the main power source system 50, and then, switches to the normal mode.

Besides, in the power saving mode, the sub-CPU 42 monitors the operation panel 51, the network unit 52, and the FAX unit 53. Accordingly, in the foregoing standby mode, even in the case where the instruction of image formation is not issued for the specified time and switching is made to the power saving mode, when an image formation instruction is received from the operation panel 51, the network unit 52, or the FAX unit 53, the sub-CPU 42 immediately switches to the normal mode. Incidentally, in this case, when an error is being detected by the detection unit 55, the power saving mode is maintained.

The operation panel 51 includes the display unit 510, and the display unit 510 can display information of an error detected by the detection unit 55. Besides, when a specified time has passed in the power saving mode, power supply to the display unit 510 is interrupted and the display disappears, however, when the user operates the operation panel 51 in this state, power is again supplied to the display unit 510.

Incidentally, in the control of the operation panel 51, the network unit 52, the FAX unit 53, and the detection unit 55 in the power saving mode, since the reception confirmation of a print instruction etc., and the confirmation of error removal have only to be performed, the sub-CPU 42 may be an inexpensive and low spec one such as a microcomputer. Alternatively, a low spec CPU already provided in the operation panel 51 or the like may be substituted.

Figure 3:
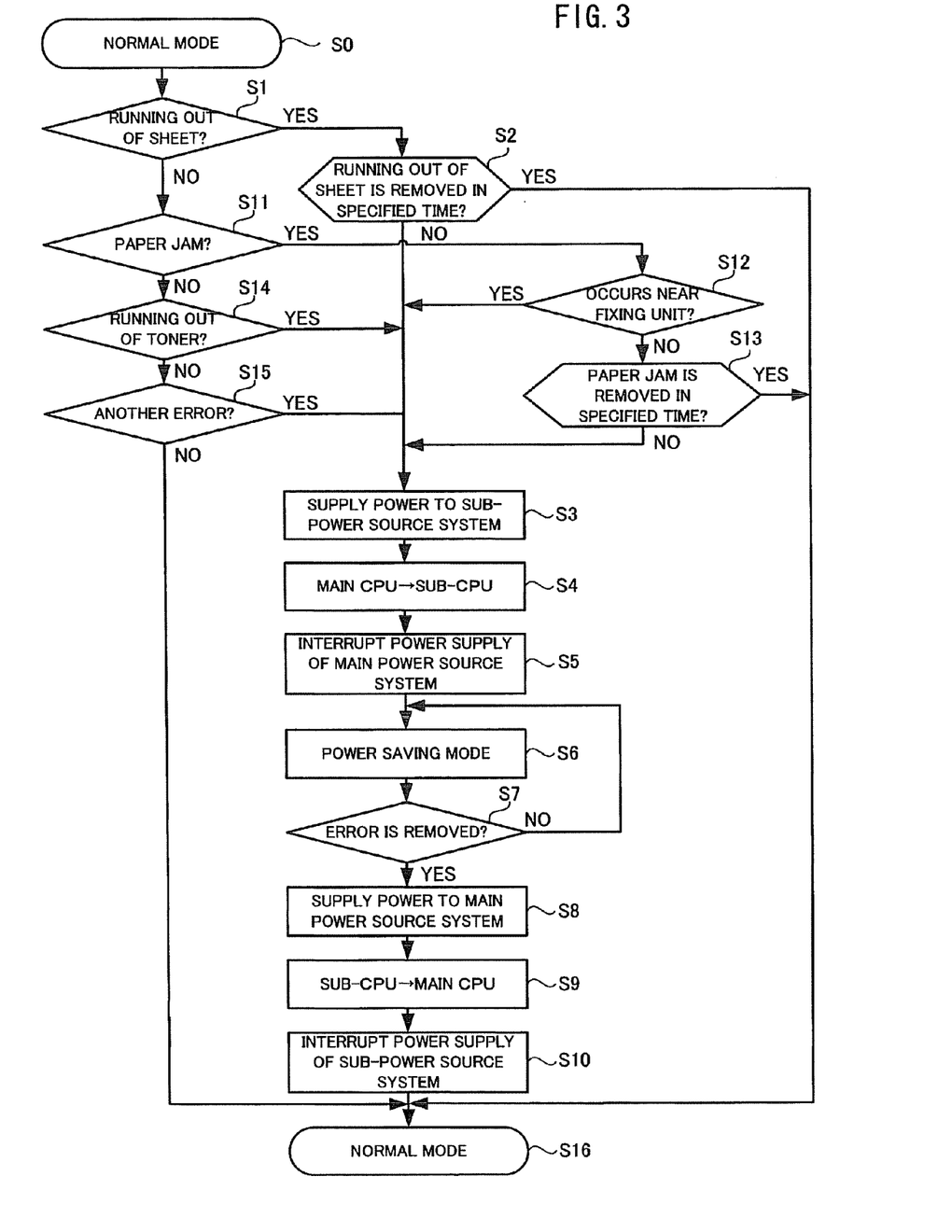
FIG. 3 is a flowchart for explaining an operation of the image forming apparatus of the embodiment of the invention.

Next, the operation of the image forming apparatus of the embodiment of the invention will be described with reference to FIG. 3. FIG. 3 is a flowchart for explaining the operation when the mode of the image forming apparatus shifts from the normal mode to the power saving mode and the operation when the mode shifts from the power saving mode to the normal mode.

In FIG. 3, step S0 indicates the normal mode. When sheet runs out during the image formation and the sheet detection unit 56 detects the running out of sheet at step S1, the sheet detection unit 56 sends a signal indicating no sheet to the main CPU 41.

The main CPU 41 receives this signal and switches to the power saving mode, however, switching is not immediately made but is made to the power saving mode in the case where the running out of sheet is not removed in a specified time at step S2. This is because, even if the sheet runs out, there is also a case where an operator immediately replenishes sheets and removes the error, and this waiting is performed for some time in view of such a case.

That is, when a shift is made to the power saving mode each time the running out of sheet occurs, since power to the fixing device 33 is also interrupted, the image formation operation can not be resumed and the usability becomes worse, and this is prevented. In the case where the running out of sheet is removed in the specified time, the main CPU 41 shifts to step S16 to maintain the normal mode.

On the other hand, in the case where the running out of sheet is not removed for the specified time since, for example, there is no operator around the image forming apparatus 1, step S2 shifts to step S3, the main CPU 41 controls the power source control unit 73, and power is supplied from the sub-power source 72 of the power source circuit 70 to the sub-power source system 60. By this, a switching operation to the power saving mode is started.

Next, when confirming that power is supplied to the sub-power source system 60 and the sub-CPU 42 starts, the main CPU 41 shifts the control of the system to the control of the sub-CPU 42 at step S4. At step S5, power supply to the main power source system 50 is interrupted by the sub-CPU 42, a shift is made to the power saving mode at step S6.

When the shift is made to the power saving mode, the detection unit 55 is operated by the sub-power source 72, and the sub-CPU 42 controls the detection unit 55. When receiving the signal of error removal from the detection unit 55 at step S7, the sub-CPU 42 controls the power source circuit 70 through the power source control unit 73, and resumes power supply from the main power source 71 to the main power source system 60 at step S8.

When it is detected that power is supplied to the main power source system 50 and the main CPU 41 is restarted, the sub-CPU 42 shifts the control of the system from the sub-CPU 42 to the main CPU 41 at step S9. Thereafter, at step S10, power supply to the sub-power source system 60 is interrupted by the main CPU 41 or the sub-CPU 42 itself, and return is made to the normal mode (step S16).

On the other hand, in the case where the detection unit 55 detects another error, for example, at step S11, the jam detection unit 57 detects a paper jam during the image formation, the main CPU 41 acquires a signal representing the paper jam and position information of the occurrence. When the paper jam is detected, a shift is made to step S12, and the main CPU 41 determines whether the occurrence position of the paper jam is near the fixing device 33.

In the case where it is found at step S12 that the occurrence position of the paper jam is near the fixing device 33, a shift is immediately made to step S3. This is because when the paper jam occurs in the fixing device 33, a sheet can be burned, and this must be prevented.

When a cover (not shown) of the image forming apparatus 1 is opened in order to remove the paper jam, the outer air is liable to flow into the image forming apparatus 1, and the temperature of the fixing device 33 is liable to decrease. As a result, since there is a possibility that power higher than the normal power is supplied and heating is performed in order to keep the fixing temperature of the fixing device 33, in the case where the paper jam occurs near the fixing device 33, the shift is immediately made to the power saving mode.

On the other hand, in the case where the occurrence position of the paper jam is a place other than the vicinity of the fixing device 33, for example, the sheet transport path or the ADF 4, the main CPU 41 determines at step S13 whether the paper jam is removed in a specified time. In the case where the paper jam is not removed in the specified time, a shift is made to step S3, and in the case where it is removed, the normal mode is maintained (step S16).

That is, there is a high possibility that the paper jam at a place other than the vicinity of the fixing device 33 can be quickly removed. Thus, when a shift is made to the power saving mode each time the paper jam occurs and power to the fixing device 33 is interrupted, image formation can not be immediately resumed and the usability is poor. Then, at step S13, in the case where the paper jam is not removed in the specified time, the shift is made to the power saving mode.

Besides, at step S14, in the case where the toner detection unit 58 detects the running out of toner during the image formation, and at step S15, in the case where the another detection unit 59 detects a serviceman call, a shift is immediately made to step S3.

Incidentally, the running out of toner at step S14 means a case where the image forming apparatus 1 can not automatically replenish the toner, that is, the exchange of a toner cartridge is required. In the case of the exchange of the toner cartridge or the serviceman call, since it takes much time to remove the error, the shift is immediately made to step S3.

Next, the operation in the display unit 510 and in the power saving mode will be described with reference to FIG. 4.

Figure 4:
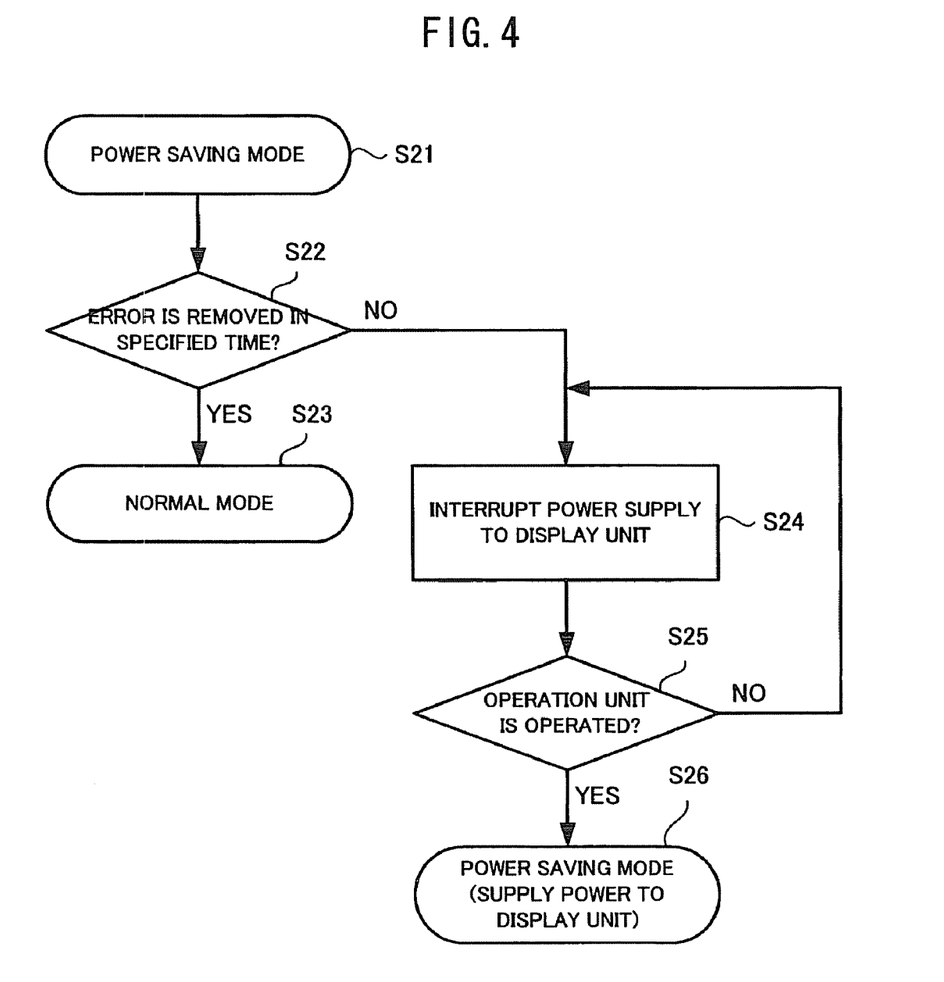
FIG. 4 is a flowchart for explaining an operation of a display unit of the image forming apparatus of the embodiment of the invention.

In FIG. 4, step S21 indicates that the power saving mode has already occurred. In the case where various errors occur and a shift is made to the power saving mode, at step S22, it is determined whether the error is removed in a specified time.

In the case where the error is removed in the specified time at step S22, a shift is made to step S23 and switching is made to the normal mode. On the other hand, in the case where the error is not removed even when the specified time has passed, at step S24, power supply from the sub-power source 72 to the operation panel 51 is interrupted, and the display on the display unit 510 is turned off.

When the user operates the operation panel 51 at step S25 while the display unit 510 is being turned off, power is supplied from the sub-power source 72 to the display unit 510 at step S26, the display unit 510 is brought into an on state, and error information can be confirmed. Besides, in the case where the user does not operate the operation panel 51, power is not supplied to the display unit 510, and the off state is maintained. Incidentally, in the normal mode, the display unit 510 is always in the on state.

In this way, with respect to the display unit 510, even in the power saving mode, the display can be performed according to the operation of the user.

Incidentally, the specified time as the reference for determination at step S2 or step S13 can be arbitrarily set by operating the operation panel 51 by the user or a maker side. Alternatively, the specified time can be previously set from the PC etc. connected to the network unit 52. Besides, the time (hereinafter referred to as the passage time) from the error occurrence to the removal as reference for determination at step S7 or step S22 is counted by, for example, a timer in the sub-CPU 42.

As stated above, in this embodiment, in the case where the running out of sheet, running out of toner, paper jam, or another error occurs, switching is made to the power saving mode, and accordingly, the power consumption can be reduced.

Besides, in the power saving mode, although the display unit 510 of the operation panel 51 is brought into the off state, in the case where the user operates the operation panel 51, power is supplied to the display unit 510, error information can be confirmed, and the error can be removed while the error information is seen. At this time, even if the user operates the operation panel 51, in the case where the error is not removed, power is not supplied to the main power source system 50, and the power saving mode is maintained. Accordingly, also during error removal, the power consumption can be efficiently reduced.

Besides, in the power saving mode, the detection unit 55 operates under the control of the sub-CPU 42, and in this case, it is unnecessary to use a high-performance CPU. Accordingly, when the sub-CPU 42 lower in performance than the main CPU 41 and having low power consumption is used, the power consumption can be efficiently reduced, and the error state can also be sufficiently monitored.

Further, the shift to the power saving mode at the time of error occurrence and the return from the power saving mode to the normal mode can be automatically performed by the control of the main CPU 41 and the sub-CPU 42.

Incidentally, at step S12, in the case where the paper jam occurs near the fixing device 33, a shift is immediately made to step S3, however, power supplied to the fixing device 33 is made lower than that of the normal mode, and the temperature of the heat roller 34 is lowered into a preheat mode, and then, a shift is made to step S3 and switching may be made to the power saving mode.

Besides, at step S12, although it is determined whether the paper jam occurs near the fixing device 33, no limitation is made to this. For example, there is a case where it is appropriate to immediately shift to the power saving mode according to the occurrence position of the paper jam, and the position of the detection unit to determine the occurrence position of the paper jam may be changed, or plural detection units may be provided at plural places.

Besides, although the example in which various errors are detected and switching is made to the power saving mode has been described, also in the case where an instruction of image formation is not performed for a specified time, a shift may be made to the power saving mode.

In this case, when the specified time has passed, power is not immediately supplied to only the sub-power source system 50, and a preheat mode may be adopted so that the heat roller 34 is kept at a temperature slightly lower than the fixing temperature. By this, when an instruction of image formation is issued, the temperature can be immediately raised to the fixing temperature.

Besides, according to the passage of the specified time, the heat roller 34 is switched from the preheat mode to the sleep mode stepwise. In the sleep mode, since the heat roller 34 is driven by the power further lower than the preheat mode, the power consumption can be reduced.

In this way, when a shift is made to the power saving mode after the preheat mode and the sleep mode, the control according to the passage time becomes possible.

Besides, with respect to the return from the power saving mode to the normal mode, switching may be made by detecting that the removal operation of various errors is started in the specified time. Alternatively, both detection results as to whether the error is removed in the specified time and whether the removal operation of the error is started in the specified time may be used.

Further, when a shift is made to the power saving mode, the unit of the main power source system 50 may be controlled stepwise. For example, the operation of the scanner unit 2 is first stopped, and the fixing device 33 of the printer unit 3 is brought into the preheat mode, and further, after a specified time has passed, all operations of the main power source system 50 including the printer unit 3 may be stopped.

As stated above, according to the invention, it is possible to provide the image forming apparatus and the control method thereof in which in the case where an error of the apparatus occurs, the power consumption can be reduced.

Incidentally, no limitation is made to the above description, and various modifications can be made within the scope not departing from the claims.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An image forming apparatus having a first mode for performing an image forming process and a second mode with power consumption lower than that of the first mode, comprising:
    a detection unit that includes a plurality of error detection units and configured to detect presence and absence of an error of the image forming apparatus;
    a main control unit configured to switch to the second mode in response to the error being detected in the first mode, and to return to the first mode in response to the error being removed in the second mode, wherein the main control unit is further configured to select a timing for switching from the first mode to the second mode, from at least two different timings, based on content of the error;
    a power source circuit configured to generate power for the first mode and the second mode, and to supply the power for operation of the image forming apparatus; and
    a power source control unit configured to supply power to a first circuit portion including an image forming unit and the detection unit in the first mode, and to stop power supply to the image forming unit and to supply power to a second circuit portion including at least the detection unit in the second mode.

2. The image forming apparatus of claim 1, wherein the main control unit includes a first control unit and a second control unit with power consumption lower than that of the first control unit, and the first control unit is configured to control the image forming unit and the detection unit in the first mode and the second control unit is configured to control the detection unit in the second mode.

3. The image forming apparatus of claim 1, wherein the detection unit includes a sheet detection unit configured to detect presence and absence of sheets in a paper feed device in the image forming apparatus, and wherein in response to the sheet detection unit detecting an absence of sheets in the first mode, the main control unit switches to the second mode if the absence of sheets is not corrected after a specified amount of time subsequent to detecting the absence of the sheets.

4. The image forming apparatus of claim 1, wherein the detection unit includes a jam detection unit disposed on a sheet transport passage, the image forming unit including a fixing device configured to fix an image on the sheet, and wherein:
    in response to the jam detection unit detecting a paper jam within a predefined distance from the fixing device in the first mode, the main control unit switches to the second mode after a first specified amount of time subsequent to detection of the paper jam if the paper jam is not removed within the first specified amount of time, and in response to the jam detection unit detecting a paper jam at a location outside the predefined distance from the fixing device, the main control unit switches to the second mode after a second specified amount of time subsequent to detection of the paper jam if the paper jam is not removed within the second specified amount of time.

5. The image forming apparatus of claim 1, wherein the detection unit includes a jam detection unit disposed on a sheet transport passage, the image forming unit including a fixing device configured to fix an image on the sheet, and wherein in response to the jam detection unit detecting a paper jam within a predetermined distance from the fixing device in the first mode, the main control unit lowers a temperature of the fixing device in a stepwise manner and switches to the second mode.

6. The image forming apparatus of claim 1, wherein the detection unit includes a toner detection unit configured to detect presence and absence of toner of a developing device in the image forming apparatus, and in response to the toner detection unit detecting insufficient toner in the first mode, the main control unit switches to the second mode.

7. The image forming apparatus of claim 1, wherein the image forming unit includes a scanner unit configured to read a document and a printer unit configured to print an image of the document on a sheet, and wherein the power source control unit is configured to, in response to a switch from the first mode to the second mode, remove power from the scanner unit prior to removing power from the printer unit.

8. The image forming apparatus of claim 1, further comprising an operation panel including an operation unit configured to operate the image forming apparatus and a display unit configured to display a detection result of the detection unit, wherein the power source control unit is configured to turn the display unit on in the first mode, to turn the display unit off in the second mode after a specified amount of time has passed since detection of the error, and to turn the display unit on in response to the operation unit being operated in the second mode.

9. The image forming apparatus of claim 1, wherein the detection unit includes a serviceman call detection unit, and wherein in response to the serviceman call detection unit detecting an error, the main control unit switches to the second mode.

10. A method for controlling power consumption in an image forming device having a first mode for performing an image forming process and a second mode having power consumption lower than that of the first mode, comprising:

detecting, by a detection unit having a plurality of error detection units, presence or absence of an error of the image forming apparatus;

responding to a result of the detecting, wherein the responding comprises switching to the second mode if the error is detected in the first mode, and returning to the first mode if the error is removed in the second mode;

selecting a first timing for the switching to the second mode in response to a content of the error indicating a first type of error, and selecting a second timing for the switching to the second mode in response to the content of the error indicating a second type of error;

generating power for the first mode and the second mode, and controlling supply of the power according to the first mode or the second mode;

supplying the power to a first circuit portion including an image forming unit and the detection unit in the first mode; and stopping power supply to the image forming unit and supplying the power to a second circuit portion including at least the detection unit in the second mode.

11. The method of claim 10, further comprising:

detecting an absence of paper in a paper feed device of the image forming device in the first mode, and switching to the second mode in response to the detecting if a presence of paper is not detected within a specified time after the detecting the absence.

12. The method of claim 10, further comprising:

detecting a paper jam on a sheet transport passage in the first mode;

switching to the second mode after a first specified amount of time in response to the detecting the paper jam if the paper jam occurs within a predefined distance from a fixing device and if the paper jam is not corrected within the first specified amount of time; and switching to the second mode after a second specified amount of time in response to the detecting the paper jam if the paper jam occurs outside the predefined distance from the fixing device and if the paper jam is not corrected within the second specified amount time.

13. The method of claim 10, further comprising:

detecting a paper jam on a sheet transport passage in the first mode; and if the detecting determines that the paper jam occurred within a predetermined distance from a fixing device:
lowering a temperature of the fixing device in a stepwise fashion; and
switching to the second mode.

14. The method of claim 10, further comprising:

detecting, in the first mode, absence of toner of a developing device of the image forming apparatus; and switching to the second mode in response to the detecting the absence of toner.

15. The method of claim 10, further comprising removing power from a scanner unit of the image forming device prior to removing power from a printer unit of the image forming device in response to switching from the first mode to the second mode.

16. The method of claim 10, further comprising:

turning off a display unit of the image forming device in the second mode after a specified time has elapsed since the detecting the presence of the error; and turning on the display unit in response to the operation unit being operated in the second mode.

17. The method of claim 10, further comprising switching to the second mode in response to detecting a serviceman call.

* * * * *